Patented Apr. 22, 1952

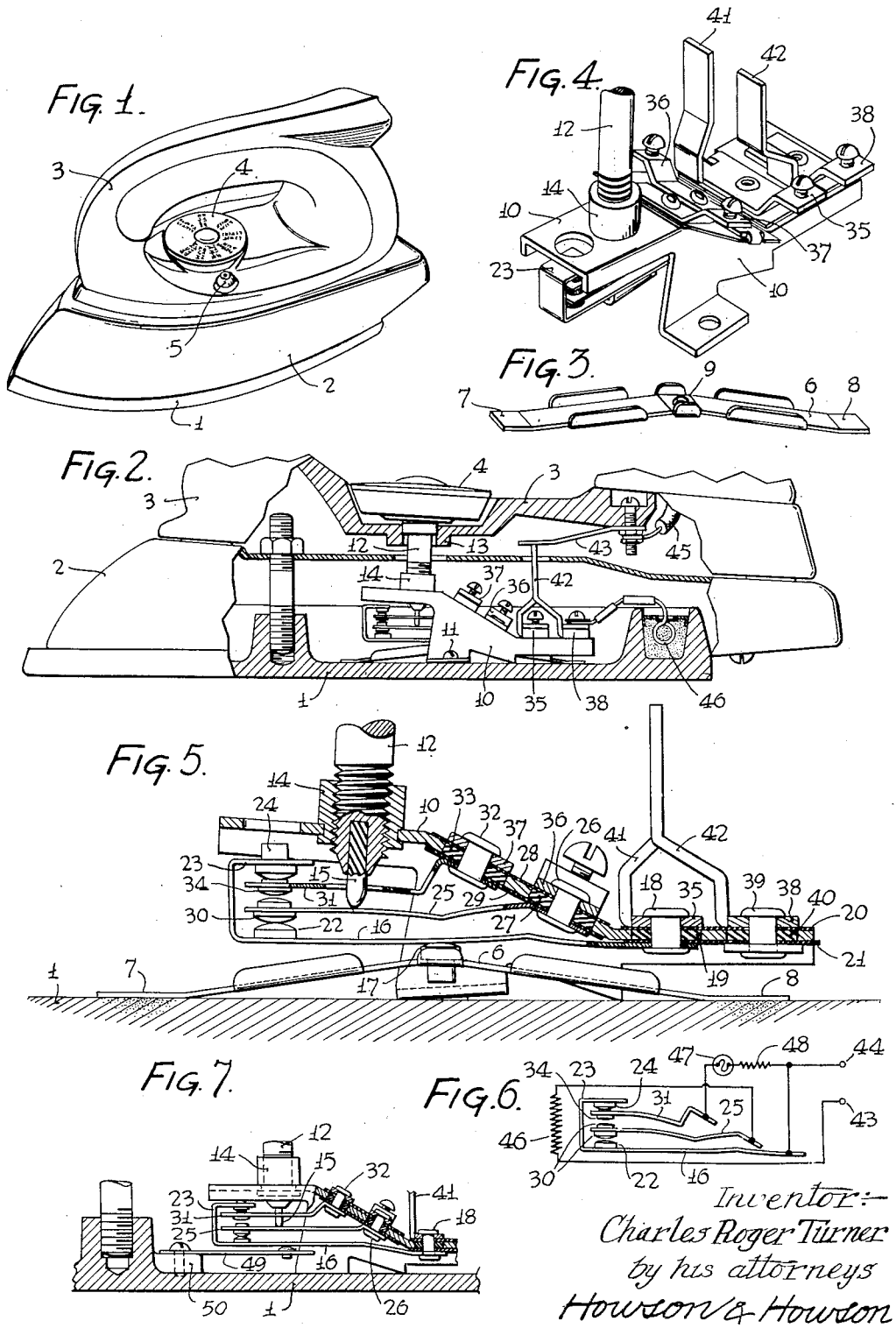

2,593,812

UNITED STATES PATENT OFFICE 2,593,812

THERMOSTATIC CONTROL AND EXCESSIVE TEMPERATURE INDICATION MECHANISM

Charles Roger Turner, Enfield, Springfield Township, Montgomery County, Pa., assignor to Proctor Electric Company, Philadelphia, Pa., a corporation of Pennsylvania Application October 30, 1947, Serial No. 783,018

9 Claims. (Cl. 177—311)

This invention relates to thermostatically-controlled electrically-heated devices, such as household appliances. More particularly, the invention relates to the provision in such devices of means for indicating excessive temperatures.

It is characteristic of thermostatically-controlled devices, such as household appliances, that for a particular temperature setting there is a certain operating temperature range defined by lower and upper limits at which the thermostatically-controlled switch is closed and opened. In the past, signaling means have been provided in conjunction with temperature-adjustable thermostatically-controlled devices, such as household appliances, to indicate whether or not the heating means is energized. Thus, on flat-irons, toasters, waffle-irons, etc., it has been common practice to provide a signal lamp which is energized, to indicate this fact to the user. It has also been proposed to provide means for indicating whether or not the temperature of the controlled device is within the operating temperature range for a given temperature setting. Such prior indicating means do not apprise the user as to whether the temperature of the device is in excess of the operating temperature range for the instant temperature setting. In the case of the prior device last mentioned above, the user is only apprised as to whether or not the temperature of the device is outside the operating temperature range for a given temperature setting. The temperature of the device may be either above or below the operating temperature range, and the user has no way of knowing which is the case.

In the operation of a temperature-adjustable thermostatically-controlled device, such as a household appliance, there are times when the temperature of the device is above the operating temperature range for the instant temperature setting, and this condition may give rise to serious consequences. For example, in the case of a flat-iron, when the temperature setting is lowered—as is commonly done in ironing different fabrics—the temperature of the sole plate is temporarily above the operating temperature range for the lower temperature setting, and the use of the iron under such a condition may cause damage to delicate fabrics requiring the lower temperature setting. Moreover, even when the temperature setting remains unchanged, the temperature of the sole plate may "overshoot," i. e. rise above the upper limit of the operating temperature range, and the excess heat may cause damage to delicate fabrics. As another example, in the case of cooking ovens and the like, excessive temperature may dehydrate the foods being cooked and may even cause charring and burning thereof.

The principal object of the present invention is to provide, in a temperature-adjustable thermostatically-controlled device, means for apprising the user of an excessive temperature condition as above mentioned.

Another object of the invention is to provide in such a device a unitary and simple switch mechanism for controlling an indicating means in such manner that the latter shall apprise the user of an excessive temperature condition.

Other objects and features of the invention will be apparent from the following detailed description.

While the invention is applicable generally to thermostatically-controlled electrically-heated devices, it will be described herein with specific reference to a flat-iron as shown in the accompanying drawing, wherein Fig. 1 is a perspective view of a flat-iron embodying the invention;

Fig. 2 is a fragmentary view, mostly in longitudinal section, showing the mechanism provided by the invention;

Fig. 3 is a perspective view of the switch-actuating member which is preferably employed;

Fig. 4 is a perspective view of the switch mechanism;

Fig. 5 is a longitudinal sectional view, on a relatively large scale, of the thermostatically-actuated and manually-adjustable switch mechanism;

Fig. 6 is a diagrammatic illustration of the switch mechanism and the associated electrical circuit; and Fig. 7 illustrates a modified form of the thermostat.

Referring first to Fig. 1, the flat-iron shown comprises a sole plate 1, a shell-like cover 2 secured to the sole plate, a handle 3 attached to the cover, a temperature adjustment member 4 which is preferably in the form of a dial-like knob with indicia thereon, and an indicator 5 which, in the present instance, is illuminated only when the temperature of the sole plate is dangerously in excess of the temperature setting of the knob 4, as hereinafter described.

Referring now to the other figures, the thermostat employed is preferably of the character disclosed and claimed in my copending application, Serial No. 782,861 filed October 29, 1947, now abandoned. It comprises an arched or bridge element 6 constructed and shaped as shown in Figs. 3 and 5, said element having its end portions 7 and 8 welded, or otherwise suitably secured, to the sole plate 1. This bridge element has a low thermal expansive characteristic relative to the sole plate, and therefore expansion and contraction of the sole plate, during heating and cooling thereof, causes vertical movement of the central portion 9 of the bridge element. Thus, the sole plate 1 may be formed of an aluminum alloy, as is common in many modern flat-irons, while the bridge element 6 may be formed of stainless steel or certain of the titanium alloys. The vertical movement of the central portion of the bridge element 6 controls the operation of the switch mechanism presently to be described.

As also provided in the thermostat mechanism of the above-mentioned copending application, there is provided a housing member 10 of low thermal expansion characteristic, which is removably secured to the sole plate 1 by means of screws 11, and which serves to support and house the switch mechanism. A shaft 12, which carries the temperature-adjustment knob or dial 4, is rotatably supported at its upper end by means of a bearing portion 13 on handle 3, and threadedly engages a bushing or sleeve 14 at its lower end, said bushing being supported by the housing 10. At its lower end, the shaft 12 has an inset insulating finger 15 which projects downwardly from the end of the shaft, as clearly shown in Fig. 5.

Referring particularly to the switch mechanism, as best shown in Fig. 5, a spring contact blade 16 is arranged immediately above the bridge element 6 so as to be engageable by an insulating button 17 carried by the bridge element at the central portion thereof. The contact blade 16 has one end secured to the housing 10, as by means of a rivet 18, and since the housing 10 is preferably formed of metal, the blade 16 is insulated therefrom by means of an insulating washer 19 and insulating sheets 20 and 21. The blade 16 is self-biased downwardly by its own resilience, so that it maintains itself in engagement with the insulating button 17 and follows the vertical movement of the central portion of the bridge element 6. At its free end, the blade 16 carries a contact 22, and it is generally U-shaped to provide an extending arm 23 which carries an insulating button 24.

Immediately above the contact blade 16, there is provided a second spring contact blade 25 which has one end secured to the housing 10 by means of rivet 26, being insulated from the housing by an insulating washer 27 and insulating plates 28 and 29. The spring blade 25 is self-biased upwardly by its own resilience, so as to maintain engagement with the insulating finger 15, and so as to follow the latter as it moves vertically when the temperature-adjustment knob 4 is rotated. At its free end, the blade 25 carries a double contact button 30, the lower portion of which is adapted to engage the contact 22 on contact blade 16. The switch constituted by the contacts 22 and 30 serves to control the energization of the heating means of the flat-iron according to the setting of the temperature-adjustment dial 4, and in response to the temperature of the sole plate 1 through the medium of the bridge element 6.

The switch mechanism further comprises a third spring contact blade 31 which has one end secured to housing 10 by rivet 32, and which is insulated from the housing by an insulating washer 33 and by the insulating plates 28 and 29. At its free end, the blade 31 carries a contact button 34, and this blade is self-biased upwardly by its own resilience so as to maintain engagement with the insulating button 24 on arm 23. The contact blade 31 serves to control the indicating means, as hereinafter described. It will be noted that the finger 15 extends through a relatively large opening in the contact blade 31.

As may be seen in Figs. 2, 4, and 5, the contact blades 16, 25 and 31 are provided with transverse terminal members 35, 36 and 37, respectively, these terminal members being electrically connected to the associated contact blades through the associated rivets. There is also provided a transverse terminal member 38 which is secured to the housing 10 by rivet 39 and is insulated from the housing by an insulating washer 40 and by the insulating sheets 20 and 21. The terminal members 35 and 38 have upwardly-extending fingers 41 and 42 which are engaged by spring fingers mounted on the handle 3, one of the latter fingers being visible at 43 in Fig. 2. These latter fingers constitute current supply terminals, as indicated at 43 and 44 in Fig. 6, and they are connected to current supply conductors, one of which may be seen in Fig. 2 at 45.

The heating element 46 of the flat-iron is visible in Fig. 2 and is shown diagrammatically in Fig. 6. The construction and arrangement of the heating element are conventional and do not require detailed description, particularly since the present invention is not concerned with the details thereof.

As may be seen in Fig. 6, one of the heating element 46 is connected to the terminal 43, while the other end of the heating element is connected to the spring contact blade 25. An indicator lamp 47, which is preferably a neon glow lamp, is electrically connected between terminal 44 and the contact blade 31. A resistor 48, having a very high resistance in comparison to the resistance of the heating element, is connected in series with the lamp 47. It will be noted that the heating element 46 and the switch 22—30 are serially connected in a main circuit between the terminals 43 and 44. It will also be noted that the switch 30—34, lamp 47 and resistor 48 are serially connected in a branch which is in parallel or shunt relation with the switch 22—30.

Considering the operation of the flat-iron illustrated and described, when the iron is cold and the control knob or dial is in "Off" position, the switch contacts are relatively disposed as shown in Fig. 6, both the heating element 46 and the lamp 47 being deenergized. Suppose now that the user places the iron in operation by adjusting the dial 4 to an operative position. This causes downward movement of the shaft 12, and the insulating finger 15 moves the contact blade 25 downward to cause engagement of contacts 22 and 30, as shown in Fig. 5. As may be seen in Fig. 6, the closure of these contacts effects energization of the heating element 46, but the lamp 47 remains deenergized. As the sole plate of the iron becomes heated, it expands and causes downward movement of the central portion of the bridge element 6. The contact blade 16 follows the bridge element, due to the fact that said blade is self-biased downwardly, and at a certain temperature, depending upon the setting of the dial 4, the contacts 22 and 30 are opened, thus deenergizing the heating element.

If the temperature of the sole plate should "over-shoot" the upper limit of the operating range established by the setting of the dial 4, continued downward movement of the blade 16 will cause corresponding movement of the insulating button 24, which will move the contact blade 31 downward sufficiently to cause engagement of contacts 30 and 34. This will cause energization of the lamp 47 by completion of a circuit which extends from terminal 44 through the lamp resistor, contact blades 31 and 25 and heating element 46 to terminal 43. The user will thus be apprised that the temperature of the sole plate is temporarily in excess of the upper temperature limit for the instant setting of the dial 4. It should be noted that while the heating element is included in the lamp energizing circuit, the resistor 48 limits the current to such a low value that the heating element produces only negligible heat. By way of example, the resistor 48 may have a resistance of 50,000 to 200,000 ohms, and when it is considered that the heating element may be of a capacity to consume 1,000 watts or more when connected directly 110 volts, it is readily apparent that current flow through the heating element is negligible.

The excess temperature condition, indicated by the lamp 47, will be of short duration, because the sole plate will soon commence to cool and the contacts 30 and 34 will soon be opened, interrupting the lamp energizing circuit.

Suppose now that after using the iron with one setting of the dial 4, the user adjusts the dial for a lower temperature setting, preparatory to ironing fabric which requires the lower temperature setting. Such adjustment causes upward movement of the contact blade 25, with consequent engagement of contacts 30 and 34. Accordingly, the lamp 47 will be energized as above described, and the user will be apprised of the fact that the sole plate temperature is in excess of the upper temperature limit for the new setting. The user will then permit the iron to cool until the light is extinguished. Cooling of the sole plate causes the blade 16 to rise with consequent rising of blade 31 until the contacts 30 and 34 are disengaged.

It will be seen from the above description, that the lamp-controlling switch constituted by contacts 30 and 34 is under joint control of the thermostat mechanism and the temperature-adjustment means in such manner that the indicator lamp is energized whenever the temperature of the sole plate is in excess of the upper temperature limit for a given setting of the control knob or dial. This is due to the fact that the position of contact 34 is controlled by the thermostat mechanism, while the position of contact 30 is controlled by the temperature-adjustment knob. It is important, of course, that the switch mechanism be properly constructed, with proper normal spacing between the contacts, in order to assure the energization of the indicator lamp only when an excessive temperature condition exists as above described.

An important feature of the switch mechanism is the ease with which it may be assembled on a device such as a flatiron. Since the contact blades 16, 25 and 31 are all carried by the housing 10, these elements form a complete switch unit which may be placed over the bridge element 9 after the latter has been attached to the heatable body, e. g. the sole plate of a flatiron. It is merely necessary then to insert the screws 11, make the necessary electrical connections to the switch elements, and insert the shaft 12 into the bushing 14. The ease with which the parts may be assembled greatly facilitates and lessens the cost of commercial production of the device, e. g. a flatiron, on which the thermostatic control is employed.

While the thermostat mechanism is preferably of the type disclosed in the above-mentioned copending application, it will be apparent that the thermostat may take any suitable form, as long as it actuates the switch mechanism in the desired manner. Thus, in Fig. 7, there is shown a bimetallic member 49 mounted on a boss 50 on the sole plate and is adapted to flex downward in response to heat derived from the sole plate. Otherwise the structure and operation are the same as above described, the bimetal element simply replacing the bridge element 6 of the first embodiment.

It will be apparent also that the broad concept of the present invention may be carried out by the use of any suitable switch mechanism and arrangement adapted for the primary purpose of the invention, i. e. to give an indication of an excessive temperature condition as above described. It will be understood, therefore, that the invention is not limited to the specific structure illustrated and described herein.

I claim:

1. A thermostatic control mechanism operable in response to temperature variations of a heated body to control the temperature of said body, said mechanism comprising a supporting frame, a pair of relatively movable current carrying members having thereon mutually engageable electrical contacts the first of said pair of relatively movable contact carrying members being adapted to engage a third current carrying member having thereon an electrical contact engageable by the electrical contact on the second of said pair of members, adjusting means for varying the position of the second of said pair of members, all of said members being insulatedly attached to said supporting frame, a thermoresponsive element responsive to the temperature of the heated body adapted to vary the position of the first of said pair of members, said pair of members being adapted to be in current carrying contact when the temperature of the body is below that corresponding to the setting of the adjusting means, and the second of said pair of members being adapted to be held in current carrying contact with the third member when the temperature of the body is above that corresponding to the setting of the adjusting means.

2. A thermostatic control mechanism operable in response to temperature variations of a device to be controlled, said mechanism comprising a support member removably attachable to said device, a first contact arm carried by said member, a second contact arm carried by said member and cooperable with said first contact arm, a third contact arm carried by said member and cooperable with said second contact arm, means on said first contact arm for actuating said third contact arm, means responsive to said temperature variations for actuating said first contact arm, and manually-operable means for adjusting said second contact arm.

3. A control mechanism for use in a thermostatically-controlled device, comprising a support member removably attachable to said device, three resilient contact arms supported by said member and arranged in succession adjacent one another, the first two contact arms being self-biased in opposite directions away from one other, the first contact arm being adapted to be moved against its self-biasing force toward the second contact arm, a manually-adjustable element supported by said member and adapted to engage the second contact arm in opposition to its self-biasing force and position said arm relative to the first contact arm, the third contact arm being self-biased away from the second contact arm, and an extension on the first contact arm engageable with the third contact arm in opposition to the self-biasing force of the latter arm.

4. In an electrically-heated device, electrical heating means for producing desired temperatures in said device, thermomotive means responsive to said temperatures, a first switch element positionally controlled by said thermomotive means, manually-adjustable temperature-selecting means, a second switch element cooperatively associated with said first switch element and positionally controlled by said temperature selecting means, circuit means including said heating means and said switch elements in series, whereby the energization of said heating means is controlled by said thermomotive means according to the setting of said temperature-selecting means, a third switch element arranged cooperatively with said second switch element, means for positioning said third switch element in correspondence to the positioning of said first switch element, an indicating lamp, a resistor, and circuit connections controlled by said second and third switch elements for connecting said lamp, said resistor and said heating means in a series circuit whenever the temperature in said device exceeds the temperature range of operation corresponding to the setting of said temperature selecting means, said resistor substantially reducing the heating effect of said heating means during the series connection of the resistor and the heating means.

5. A thermostatic control mechanism for controlling the energization of electrical heating means of an electrically heated device and for controlling excessive temperature indicating means, said mechanism comprising manually adjustable temperature selecting means and switch means having only three contact members arranged in sucession and forming two switches one for control of said electrical heating means and the other for control of said indicating means, thermomotive means arranged to control the first switch in response to the temperature of said device and in accordance with the setting of the manually adjustable means, and an operating connection extending between members of the two switches to effect closure of the second switch whenever the temperature selected through said manually adjustable means is exceeded.

6. A thermostatic control mechanism for controlling the energization of electrical heating means of an electrically-heated device and for controlling excessive temperature-indicating means, said mechanism comprising three resilient contact arms arranged in succession adjacent one another, the central arm and one of the outer arms being self-biased away from one another, said outer arm being adapted to be moved against its self-biasing force toward the central arm, a manually-adjustable element arranged to engage the central arm in opposition to its self-biasing force and adapted to position said central arm relative to said outer arm, the other outer arm being self-biased away from the central arm, and an extension on the first-mentioned outer arm engageable with said other outer arm in opposition to the self-biasing force of the latter arm.

7. A thermostatic control mechanism operable in response to temperature variations, comprising a support member, a first contact arm carried by said member, a second contact arm carried by said member and cooperable with said first contact arm, a third contact arm carried by said member and cooperable with said second contact arm, means for actuating said third contact arm from said first contact arm, means responsive to said temperature variations for actuating said first contact arm, and manually-operable means for adjusting said second contact arm.

8. In an electrically-heated device, electrical heating means for producing desired temperatures in said device, switch means comprising three movable contact members arranged in succession adjacent one another and forming two switches, manual means for adjusting a first one of said switches, means operable in response to the temperature of said device for effecting operation of said first switch according to the setting of said manual means, circuit means including said heating means and said first switch in series, whereby the energization of said heating means is controlled by said temperature-responsive means, means for actuating the second switch from said first switch to effect closure of the second switch whenever the temperature in said device exceeds the temperature range of operation corresponding to the setting of said manual means, an indicating lamp, a resistor, and circuit connections controlled by said second switch for connecting said lamp, said resistor and said heating means in a series circuit, said resistor substantially reducing the heating effect of said heating means during the series connection of the resistor and the heating means.

9. In an electrically-heated device, electrical heating means for producing desired temperatures in said device, a pair of switches, manual means for adjusting a first one of said switches, means operable in response to the temperature of said device for effecting operation of said first switch according to the setting of said manual means, circuit means including said heating means and said first switch in series, whereby the energization of said heating means is controlled by said temperature-responsive means, means for actuating the second switch to effect closure of the same whenever the temperature in said device exceeds the temperature range of operation corresponding to the setting of said manual means, an indicating lamp, a resistor, and circuit connections controlled by said second switch for connecting said lamp, said resistor and said heating means in a series circuit, said resistor substantially reducing the heating effect of said heating means during the series connection of the resistor and the heating means.

CHARLES ROGER TURNER.

REFERENCES CITED

The following references are of record in the file of this patent:

UNITED STATES PATENTS

| Number | Name | Date |
|---|---|---|
| 1,957,343 | Hurxthal et al. | May 1, 1934 |
| 2,208,432 | Samuels | July 16, 1940 |
| 2,409,420 | Clark | Oct. 15, 1946 |
| 2,414,799 | Campbell | Jan. 28, 1947 |
| 2,433,124 | Johnson | Dec. 23, 1947 |
| 2,476,083 | Clark | July 12, 1949 |